(12) United States Patent  (10) Patent No.: US 8,397,889 B2
Gold  (45) Date of Patent: Mar. 19, 2013

(54) FRICTIONAL DEVICE COMPRISING AT LEAST ONE FRICTION PLATE

(75) Inventor: Eckart Gold, Hockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 927 days.

(21) Appl. No.: 12/400,904

(22) Filed: Mar. 10, 2009

(65) Prior Publication Data

US 2009/0229939 A1 Sep. 17, 2009

(30) Foreign Application Priority Data

Mar. 12, 2008 (DE) .......................... 10 2008 013 907

(51) Int. Cl.
*F16D 11/06* (2006.01)
(52) U.S. Cl. ........................................................ 192/70
(58) Field of Classification Search ................. 188/71.5; 29/274; 192/70.2, 70.12, 113.36; 74/446, 74/447
See application file for complete search history.

(56) References Cited

U.S. PATENT DOCUMENTS

| | | | |
|---|---|---|---|
| 1,039,168 | A | 9/1912 | Melton |
| 1,682,198 | A | 8/1928 | Sitton |
| 1,860,147 | A | 5/1932 | Hadley |
| 2,100,347 | A | 11/1937 | Nanfeldt |
| 2,182,208 | A | 12/1939 | Nason |
| 2,221,893 | A | 11/1940 | White |
| 2,307,814 | A | 1/1943 | Walters |
| 2,316,874 | A | 4/1943 | Kraft |
| 2,354,526 | A | 7/1944 | Lapsley et al. |
| 2,516,544 | A | 7/1950 | Breeze |
| 2,555,261 | A | 5/1951 | Walters |
| 2,702,770 | A | 2/1955 | Steck |
| 2,749,264 | A | 6/1956 | Emrick |
| 2,779,668 | A | 1/1957 | Daniels |

(Continued)

FOREIGN PATENT DOCUMENTS

| | | |
|---|---|---|
| CH | 312771 A | 2/1956 |
| CH | 1057662 A | 1/1992 |

(Continued)

OTHER PUBLICATIONS

Application No. EP01309199 Search Report, completed Feb. 15, 2002.

(Continued)

*Primary Examiner* — David D Le
*Assistant Examiner* — David J Hlavka
(74) *Attorney, Agent, or Firm* — BrooksGroup

(57) ABSTRACT

The present invention relates to a frictional device (6) comprising at least one friction plate (2), which has a plate-side toothing system (14), and a plate carrier (4), which has a carrier-side toothing system (70) and a predefined fitting end (66) for fitting the friction plate (2), the contours (62, 72) of the toothing systems (14, 70) corresponding to one another in such a way that the friction plate (2) can be brought into engagement with the plate carrier (4), forming a rotational drive connection. The friction plate (2) here has a first axial direction (16) and an opposing second axial direction (18). According to the invention the contours (62, 72) of the toothing systems (14, 70) are formed in such a way that only in the first axial direction (16) can the friction plate (2) be brought into engagement with the plate carrier (4) via the predefined fitting end (66) of the plate carrier (4).

21 Claims, 6 Drawing Sheets

U.S. PATENT DOCUMENTS

Figure 1:
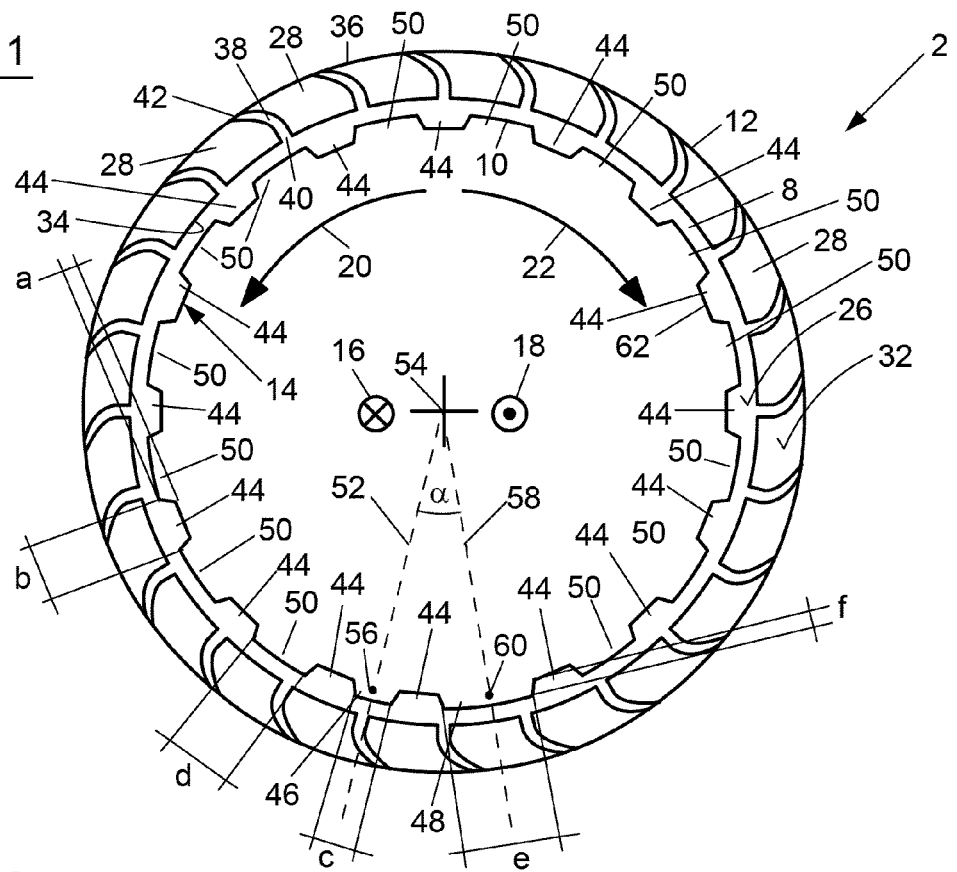

| | | |
|---|---|---|
| 3,020,139 A | 2/1962 | Camp et al. |
| 3,080,028 A | 3/1963 | Kennedy |
| 3,215,648 A | 11/1965 | Duffy |
| 3,270,846 A | 9/1966 | Arledter et al. |
| 3,429,766 A | 2/1969 | Stormfeltz |
| 3,520,390 A | 7/1970 | Bentz |
| 3,526,306 A | 9/1970 | Bentz |
| 3,578,122 A | 5/1971 | Magnier |
| 3,654,777 A | 4/1972 | Grundman |
| 3,746,669 A | 7/1973 | Dunnom |
| 3,871,934 A | 3/1975 | Marin |
| 3,885,006 A | 5/1975 | Hatch et al. |
| 3,899,050 A | 8/1975 | Savary et al. |
| 3,911,045 A | 10/1975 | Hartmann et al. |
| 3,927,241 A | 12/1975 | Augustin |
| 3,944,686 A | 3/1976 | Froberg |
| 3,950,047 A | 4/1976 | Capelli |
| 3,980,729 A | 9/1976 | Yokokawa et al. |
| 4,002,225 A | 1/1977 | Marin |
| 4,020,226 A | 4/1977 | Andrianov et al. |
| 4,033,437 A | 7/1977 | Labat |
| 4,045,608 A | 8/1977 | Todd |
| 4,051,097 A | 9/1977 | Aldrich |
| 4,084,863 A | 4/1978 | Capelli |
| 4,098,630 A | 7/1978 | Morse |
| 4,113,894 A | 9/1978 | Koch, II |
| 4,150,188 A | 4/1979 | Brulet |
| 4,197,223 A | 4/1980 | Bartram |
| 4,209,086 A | 6/1980 | Friedrich |
| 4,226,906 A | 10/1980 | Jacob |
| 4,239,666 A | 12/1980 | Jacko et al. |
| 4,256,801 A | 3/1981 | Chuluda |
| 4,259,397 A | 3/1981 | Saito et al. |
| 4,260,047 A | 4/1981 | Nels |
| 4,267,912 A | 5/1981 | Bauer et al. |
| 4,291,794 A | 9/1981 | Bauer |
| 4,320,823 A | 3/1982 | Covaleski |
| 4,324,706 A | 4/1982 | Tabe et al. |
| 4,352,750 A | 10/1982 | Eschen |
| 4,373,038 A | 2/1983 | Moraw et al. |
| 4,374,211 A | 2/1983 | Gallagher et al. |
| 4,396,100 A | 8/1983 | Eltze |
| 4,444,574 A | 4/1984 | Tradewell et al. |
| 4,451,590 A | 5/1984 | Fujimaki et al. |
| 4,453,106 A | 6/1984 | La Fiandra |
| 4,456,650 A | 6/1984 | Melotik et al. |
| 4,457,967 A | 7/1984 | Chareire et al. |
| 4,490,432 A | 12/1984 | Jordan |
| 4,514,541 A | 4/1985 | Frances |
| 4,522,290 A | 6/1985 | Klink |
| 4,524,169 A | 6/1985 | Wolff et al. |
| 4,543,106 A | 9/1985 | Parekh |
| 4,563,386 A | 1/1986 | Schwartz |
| 4,593,802 A | 6/1986 | Danko, Jr. |
| 4,628,001 A | 12/1986 | Sasaki et al. |
| 4,639,392 A | 1/1987 | Nels et al. |
| 4,646,900 A | 3/1987 | Crawford et al. |
| 4,656,203 A | 4/1987 | Parker |
| 4,657,951 A | 4/1987 | Takarada et al. |
| 4,663,230 A | 5/1987 | Tennent |
| 4,663,368 A | 5/1987 | Harding et al. |
| 4,672,082 A | 6/1987 | Nakagawa et al. |
| 4,674,616 A | 6/1987 | Mannino, Jr. |
| 4,694,937 A | 9/1987 | Jonas |
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,743,634 A | 5/1988 | Royer |
| 4,770,283 A | 9/1988 | Putz et al. |
| 4,772,508 A | 9/1988 | Brassell |
| 4,792,361 A | 12/1988 | Double et al. |
| 4,861,809 A | 8/1989 | Ogawa et al. |
| 4,878,282 A | 11/1989 | Bauer |
| 4,913,267 A | 4/1990 | Campbell et al. |
| 4,915,856 A | 4/1990 | Jamison |
| 4,917,743 A | 4/1990 | Gramberger et al. |
| 4,918,116 A | 4/1990 | Gardziella et al. |
| 4,927,431 A | 5/1990 | Buchanan et al. |
| 4,950,530 A | 8/1990 | Shibatani |
| 4,951,798 A | 8/1990 | Knoess |
| 4,983,457 A | 1/1991 | Hino et al. |
| 4,986,397 A | 1/1991 | Vierk |
| 4,995,500 A | 2/1991 | Payvar |
| 4,997,067 A | 3/1991 | Watts |
| 5,004,497 A | 4/1991 | Shibata et al. |
| 5,017,268 A | 5/1991 | Clitherow et al. |
| 5,033,596 A | 7/1991 | Genise |
| 5,038,628 A | 8/1991 | Kayama |
| 5,076,882 A | 12/1991 | Oyanagi et al. |
| 5,080,969 A | 1/1992 | Tokumura |
| 5,083,650 A | 1/1992 | Seiz et al. |
| 5,093,388 A | 3/1992 | Siemon, Jr. et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,164,256 A | 11/1992 | Sato et al. |
| 5,211,068 A | 5/1993 | Spitale et al. |
| 5,221,401 A | 6/1993 | Genise |
| 5,233,736 A | 8/1993 | Hill |
| 5,259,947 A | 11/1993 | Kalback et al. |
| 5,266,395 A | 11/1993 | Yamashita et al. |
| 5,269,400 A | 12/1993 | Fogelberg |
| 5,290,627 A | 3/1994 | Ikuta |
| 5,313,793 A | 5/1994 | Kirkwood et al. |
| 5,332,075 A | 7/1994 | Quigley et al. |
| 5,335,765 A | 8/1994 | Takakura et al. |
| 5,354,603 A | 10/1994 | Errede et al. |
| 5,376,425 A | 12/1994 | Asano et al. |
| 5,395,864 A | 3/1995 | Miyoshi et al. |
| 5,396,552 A | 3/1995 | Jahn et al. |
| 5,437,780 A | 8/1995 | Southard et al. |
| 5,439,087 A * | 8/1995 | Umezawa .................... 192/70.2 |
| 5,445,060 A | 8/1995 | Randall et al. |
| 5,453,317 A | 9/1995 | Yesnik |
| 5,460,255 A | 10/1995 | Quigley et al. |
| 5,472,995 A | 12/1995 | Kaminski et al. |
| 5,474,159 A | 12/1995 | Soennecken et al. |
| 5,478,642 A | 12/1995 | McCord |
| 5,501,788 A | 3/1996 | Romine et al. |
| 5,520,866 A | 5/1996 | Kaminski et al. |
| 5,529,666 A | 6/1996 | Yesnik |
| 5,540,621 A | 7/1996 | Keester et al. |
| 5,540,832 A | 7/1996 | Romino |
| 5,540,903 A | 7/1996 | Romine |
| 5,571,372 A | 11/1996 | Miyaishi et al. |
| 5,585,166 A | 12/1996 | Kearsey |
| 5,615,758 A | 4/1997 | Nels |
| 5,620,075 A | 4/1997 | Larsen et al. |
| 5,639,804 A | 6/1997 | Yesnik |
| 5,646,076 A | 7/1997 | Bortz |
| 5,648,041 A | 7/1997 | Rodgers et al. |
| 5,662,993 A | 9/1997 | Winckler |
| 5,670,231 A | 9/1997 | Ohya et al. |
| 5,671,835 A * | 9/1997 | Tanaka et al. .............. 192/107 R |
| 5,674,947 A | 10/1997 | Oishi et al. |
| 5,676,577 A | 10/1997 | Lam et al. |
| 5,705,120 A | 1/1998 | Ueno et al. |
| 5,707,905 A | 1/1998 | Lam et al. |
| 5,718,855 A | 2/1998 | Akahori et al. |
| 5,733,176 A | 3/1998 | Robinson et al. |
| 5,753,018 A | 5/1998 | Lamport et al. |
| 5,753,356 A | 5/1998 | Lam et al. |
| 5,766,523 A | 6/1998 | Rodgers et al. |
| 5,771,691 A | 6/1998 | Kirkwood et al. |
| 5,775,468 A | 7/1998 | Lam et al. |
| 5,776,288 A | 7/1998 | Stefanutti et al. |
| 5,777,791 A | 7/1998 | Hedblom |
| 5,792,544 A | 8/1998 | Klein |
| 5,803,210 A | 9/1998 | Kohno et al. |
| 5,816,901 A | 10/1998 | Sirany |
| 5,827,610 A | 10/1998 | Ramachandran |
| 5,834,551 A | 11/1998 | Haraguchi et al. |
| 5,842,551 A | 12/1998 | Nels |
| 5,845,754 A | 12/1998 | Weilant |

| Patent Number | Date | Inventor |
|---|---|---|
| 5,856,244 A | 1/1999 | Lam et al. |
| 5,858,166 A | 1/1999 | James et al. |
| 5,858,883 A | 1/1999 | Lam et al. |
| 5,889,082 A | 3/1999 | Kaminski et al. |
| 5,895,716 A | 4/1999 | Fiala et al. |
| 5,897,737 A | 4/1999 | Quigley |
| 5,919,528 A | 7/1999 | Huijs et al. |
| 5,919,837 A | 7/1999 | Kaminski et al. |
| 5,952,249 A | 9/1999 | Gibson et al. |
| 5,958,507 A | 9/1999 | Lam et al. |
| 5,965,658 A | 10/1999 | Smith et al. |
| 5,975,270 A | 11/1999 | Tokune et al. |
| 5,975,988 A | 11/1999 | Christianson |
| 5,989,375 A | 11/1999 | Bortz |
| 5,989,390 A | 11/1999 | Lee |
| 5,998,307 A | 12/1999 | Lam et al. |
| 5,998,311 A | 12/1999 | Nels |
| 6,000,510 A | 12/1999 | Kirkwood et al. |
| 6,001,750 A | 12/1999 | Lam |
| 6,019,205 A | 2/2000 | Willworth |
| 6,042,935 A | 3/2000 | Krenkel et al. |
| 6,060,536 A | 5/2000 | Matsumoto et al. |
| 6,065,579 A | 5/2000 | Nels |
| 6,074,950 A | 6/2000 | Wei |
| 6,121,168 A | 9/2000 | Irifune et al. |
| 6,123,829 A | 9/2000 | Zommerman et al. |
| 6,130,176 A | 10/2000 | Lam |
| 6,132,877 A | 10/2000 | Winckler et al. |
| 6,140,388 A | 10/2000 | Nass et al. |
| 6,163,636 A | 12/2000 | Stentz et al. |
| 6,182,804 B1 | 2/2001 | Lam |
| 6,194,059 B1 | 2/2001 | Yesnik |
| 6,217,413 B1 | 4/2001 | Christianson |
| 6,231,977 B1 | 5/2001 | Suzuki et al. |
| 6,265,066 B1 | 7/2001 | Suzuki et al. |
| 6,284,815 B1 | 9/2001 | Sasahara et al. |
| 6,291,040 B1 | 9/2001 | Moriwaki et al. |
| 6,315,974 B1 | 11/2001 | Murdie et al. |
| 6,316,086 B1 | 11/2001 | Beier et al. |
| 6,323,160 B1 | 11/2001 | Murdie et al. |
| 6,352,758 B1 | 3/2002 | Huang et al. |
| 6,383,605 B1 | 5/2002 | Ejiri |
| 6,387,531 B1 | 5/2002 | Bi et al. |
| 6,423,668 B1 | 7/2002 | Nakanishi et al. |
| 6,432,151 B1 | 8/2002 | So et al. |
| 6,432,187 B1 | 8/2002 | Ogawa et al. |
| 6,524,681 B1 | 2/2003 | Seitz et al. |
| 6,569,816 B2 | 5/2003 | Oohira et al. |
| 6,586,373 B2 | 7/2003 | Suzuki et al. |
| 6,601,321 B1 | 8/2003 | Kendall |
| 6,630,416 B1 | 10/2003 | Lam et al. |
| 6,638,883 B2 | 10/2003 | Gaffney et al. |
| 6,652,363 B2 | 11/2003 | Kramer et al. |
| 6,668,891 B2 | 12/2003 | Collis |
| 6,703,117 B2 | 3/2004 | Gruber et al. |
| 6,808,225 B2 | 10/2004 | Moriyama |
| 6,831,146 B2 | 12/2004 | Aiba et al. |
| 6,855,410 B2 | 2/2005 | Buckley |
| 6,875,711 B2 | 4/2005 | Chen et al. |
| 6,951,504 B2 | 10/2005 | Adefris et al. |
| 7,014,027 B2 | 3/2006 | Adair et al. |
| 7,160,913 B2 | 1/2007 | Schneider |
| 7,208,432 B1 | 4/2007 | Beier et al. |
| 7,294,388 B2 | 11/2007 | Lam et al. |
| 7,332,240 B2 | 2/2008 | O'Hara et al. |
| 7,429,418 B2 | 9/2008 | Lam et al. |
| 2002/0068164 A1 | 6/2002 | Martin |
| 2002/0164473 A1 | 11/2002 | Buckley |
| 2003/0050831 A1 | 3/2003 | Klayh |
| 2003/0053735 A1 | 3/2003 | Vernooy |
| 2003/0134098 A1 | 7/2003 | Bauer et al. |
| 2003/0154882 A1 | 8/2003 | Nagata et al. |
| 2004/0006192 A1 | 1/2004 | Aiba et al. |
| 2004/0033341 A1 | 2/2004 | Lam et al. |
| 2004/0043193 A1 | 3/2004 | Chen et al. |
| 2004/0043243 A1 | 3/2004 | Chen et al. |
| 2004/0081795 A1 | 4/2004 | Wang et al. |
| 2004/0081813 A1 | 4/2004 | Dong |
| 2004/0192534 A1 | 9/2004 | Nixon et al. |
| 2004/0198866 A1 | 10/2004 | Sasaki |
| 2004/0224864 A1 | 11/2004 | Patterson et al. |
| 2005/0004258 A1 | 1/2005 | Yamamoto et al. |
| 2005/0025967 A1 | 2/2005 | Lawton et al. |
| 2005/0039872 A1 | 2/2005 | Kimura et al. |
| 2005/0064778 A1 | 3/2005 | Lam et al. |
| 2005/0074595 A1 | 4/2005 | Lam |
| 2005/0075019 A1 | 4/2005 | Lam et al. |
| 2005/0075021 A1 | 4/2005 | Lam et al. |
| 2005/0075022 A1 | 4/2005 | Lam |
| 2005/0075413 A1 | 4/2005 | Lam |
| 2005/0075414 A1 | 4/2005 | Lam et al. |
| 2005/0191477 A1 | 9/2005 | Dong |
| 2005/0271876 A1 | 12/2005 | Walker et al. |
| 2005/0281971 A1 | 12/2005 | Lam et al. |
| 2006/0008635 A1 | 1/2006 | Dong et al. |
| 2006/0019085 A1 | 1/2006 | Lam et al. |
| 2006/0062987 A1 | 3/2006 | Niewohner et al. |
| 2006/0121263 A1 | 6/2006 | Komori et al. |
| 2006/0151912 A1 | 7/2006 | Bauer |
| 2006/0241207 A1 | 10/2006 | Lam et al. |
| 2007/0011951 A1 | 1/2007 | Gaeta et al. |
| 2007/0062777 A1 | 3/2007 | Zagrodzki et al. |
| 2007/0117881 A1 | 5/2007 | Watanabe et al. |
| 2007/0205076 A1 | 9/2007 | Takahashi et al. |

FOREIGN PATENT DOCUMENTS

| Country | Number | Date |
|---|---|---|
| CN | 1500850 A | 6/2004 |
| DE | 2828918 A1 | 1/1979 |
| DE | 2854051 A1 | 6/1979 |
| DE | 2937471 A1 | 3/1980 |
| DE | 3532795 A1 | 4/1986 |
| DE | 3622437 A1 | 10/1987 |
| DE | 3705657 A1 | 9/1988 |
| DE | 4211010 A1 | 10/1992 |
| DE | 4302773 A1 | 8/1993 |
| DE | 19530443 A1 | 10/1996 |
| DE | 10114074 A1 | 9/2002 |
| DE | 10157583 C1 | 12/2002 |
| DE | 102008013907 A1 | 9/2009 |
| EP | 0180381 A2 | 5/1986 |
| EP | 0202145 A1 | 11/1986 |
| EP | 0352363 B1 | 1/1988 |
| EP | 0264096 A2 | 4/1988 |
| EP | 0393845 A1 | 10/1990 |
| EP | 0510875 A2 | 10/1992 |
| EP | 0521843 A1 | 1/1993 |
| EP | 0554902 A1 | 8/1993 |
| EP | 0557905 A1 | 9/1993 |
| EP | 0581696 A1 | 2/1994 |
| EP | 0637698 A1 | 2/1995 |
| EP | 0640774 B1 | 3/1995 |
| EP | 0669482 A2 | 8/1995 |
| EP | 0965887 A1 | 2/1996 |
| EP | 0766019 A1 | 4/1997 |
| EP | 0807766 A1 | 11/1997 |
| EP | 0854305 A1 | 7/1998 |
| EP | 0971151 A1 | 1/2000 |
| EP | 1039168 A1 | 9/2000 |
| EP | 1203897 A1 | 5/2002 |
| EP | 1391629 A1 | 2/2004 |
| EP | 1394438 A1 | 3/2004 |
| EP | 1396655 A1 | 3/2004 |
| EP | 1517062 A1 | 3/2005 |
| EP | 1521001 A2 | 4/2005 |
| EP | 1521007 A2 | 4/2005 |
| EP | 1614926 A1 | 1/2006 |
| EP | 1911990 A2 | 4/2008 |
| FR | 2430545 A1 | 2/1980 |
| GB | 1054890 | 1/1967 |
| GB | 1604827 | 12/1981 |
| GB | 2224285 A | 5/1990 |
| GB | 2241246 A | 8/1991 |
| JP | 55005907 A | 1/1980 |
| JP | 58180573 A | 10/1983 |
| JP | 59103040 A | 6/1984 |
| JP | 63066230 A | 3/1988 |
| JP | 63-152735 | 6/1988 |
| JP | 1134002 A | 5/1989 |

| | | | |
|---|---|---|---|
| JP | 1163056 A | 6/1989 | |
| JP | 1307529 A | 12/1989 | |
| JP | 2017223 A | 1/1990 | |
| JP | 3281686 A | 12/1991 | |
| JP | 5009458 A | 1/1993 | |
| JP | 5247233 A | 9/1993 | |
| JP | 5247447 A | 9/1993 | |
| JP | 6240233 A | 8/1994 | |
| JP | 6299434 A | 10/1994 | |
| JP | 07-173301 | 7/1995 | |
| JP | 07-151174 | 6/1996 | |
| JP | 8210402 A | 8/1996 | |
| JP | 09-176333 | 7/1997 | |
| JP | 176667 A | 7/1997 | |
| JP | 9324824 A | 12/1997 | |
| JP | 10110740 A | 4/1998 | |
| JP | 2000-091186 | 3/2000 | |
| JP | 20000336343 | 12/2000 | |
| JP | 2002003280 A | 1/2002 | |
| JP | 2002005317 A | 1/2002 | |
| JP | 2002234951 A | 8/2002 | |
| JP | 2003003155 | 1/2003 | |
| JP | 2004132547 A | 4/2004 | |
| JP | 2004217790 A | 8/2004 | |
| JP | 2004266087 A | 9/2004 | |
| WO | WO95/26473 | 10/1995 | |
| WO | WO96/10701 A1 | 4/1996 | |
| WO | WO98/09093 A1 | 3/1998 | |
| WO | WO99/35415 A1 | 7/1999 | |
| WO | WO2005/102962 A1 | 11/2005 | |
| WO | WO2006/101799 A2 | 9/2006 | |
| WO | WO2006/116474 A2 | 11/2006 | |
| WO | WO2007/055951 A1 | 5/2007 | |

OTHER PUBLICATIONS

Application No. EP02257364 Search Report, completed Dec. 3, 2003.
Application No. EP03255504 Search Report, completed Dec. 4, 2003.
Application No. EP03256313 Search Report, completed Mar. 5, 2009.
Application No. EP04253746 Search Report, completed May 3, 2005.
Application No. EP04255582 Search Report, completed Jun. 15, 2007.
Application No. EP04255993 Search Report, completed Jun. 5, 2009.
Application No. EP05254284 Search Report, completed Nov. 2, 2005.
Application No. EP05253694 Search Report, completed Oct. 18, 2005.
Application No. EP05254474 Search Report, completed Oct. 21, 2005.
Application No. EP06758609 Search Report, completed May 6, 2008.
Application No. EP08012805 Search Report, completed Oct. 14, 2008.
Application No. EP96306350 Search Report, completed Dec. 4, 1996.
Application No. PCT/US06/15769 International Search Report and Written Opinion, International Filing Date Apr. 25, 2006.
Application No. PCT/US06/42342 International Search Report and Written Opinion, International Filing Date Oct. 31, 2006.
Application No. PCT/US07/07788 International Search Report and Written Opinion, International Filing Date Mar. 28, 2007.
Application No. PCT/US2008/073266 International Search Report, International Filing Date Aug. 15, 2008.
Application No. PCT/US2008/080617 International Search Report, International Filing Date Oct. 21, 2008.
Application No. PCT/US97-15260 International Search Report, completed Nov. 20, 1997.
ASTM D638-08 Standard Test Method for Tensile Properties of Plastics, Copyright 1996-2009, pp. 1-4 ASTM International, West Conshohocken, PA, US.
Tensile Property Testing of Plastics; MatWeb: Material Property Data, www.matweb.com/reference/tensilestrength.
Spiliadis, S., Garniture de freins a hautes performances contenant de la pulpe para-aramide Kevlar, 1141 Ingenieurs de L'Automobile, (1989) Decembre, No. 653, Courbevoie, FR.
Garshin et al., Structural Features of a Carbon Plastic Material Infiltrated with Molten Silicon; Regractories and Industrial Ceramics, pp. 419-422, 2005.
Ma et al., Effect of Infiltrating Si on Friction Properties of C/C Composites; J. Cent. South Univ. Technol. vol. 10, No. 3, Sep. 2003, pp. 173-176.
Joseph, Marjory, Introductory Tensile Science, pp. 164, Holt, Rinehart and Wilson, Fifth Edition, Copyright 1986.
Zhaoting Liu et al., Synthesis of $ZnFe_2O_4/SiO_2$ cmposites derived from a diatomite template, Bioinspiration & Biomimetics, 2 (2007) pp. 30-35.
Anderson et al., Hierarchical Pore Structures through Diatom Zeolitization, Angew. Chem, Int. Ed. 2000, vol. 39, No. 15, pp. 2707-2710.
Yajun Wang et al., Zeolitization of diatomite to prepare hierarchical porous zeolite materials through a vapor-phase transport..., j. Mater. Chem, 2002, vol. 12, pp. 812-1818.
Blanco et al., Chemical and Physical properties of carbon as related to brake performance, Elsevier, Wear 213 (1997) pp. 1-12.
Carbon Fiber for Wet-Friction Transmissions, SAE Technical, Off-Highway Engineering/Feb. 1998, pp. 46-48.
Hettinger, Jr. et al., Carboflex and Aerocarb-Ashland's New Low Cost Carbon Fiber and Carbonizing Products for Future Break Applications, 860767, Copyright 1986, pp. 1-11.
Gibson et al., Carbon/Carbon Friction Materials for Dry and Wet Brake and Clutch Applications, SAE Technical Paper Series, 890950, Copyright 1989, pp. 1-6.
Cardolite Brochure, Cardolite Corporation, www.cardolite.com, edition Jun. 2004.
What is a TPE?, GLS Corporation, www.glscorporation.com/resources/faqs.php, coypright 2007.
Lam et al., Friction Material for Continuous Slip Torque Converter Applications: Anti-Shudder Considerations, 941031, pp. 1-11.
MPEP 1504.6 Double Patenting [R-5]—25—Design Patents, United States Patent and Trademark Office, USPTO.gov, Last Modified: Dec. 5, 2006.
U.S. Appl. No. 12/185,236; Friction Material With Silicon, Feng Dong, filed Aug. 4, 2008.
U.S. Appl. No. 12/084,514; Carbon Friction Materials, Feng Dong et al., filed May 1, 2008.
U.S. Appl. No. 10/871,786; Fully Fibrous Structure Friction Material, Robert C. Lam, filed Jun. 18, 2004.
U.S. Appl. No. 11/410,722, Friction Material, Robert C. Lam, filed Apr. 25, 2006.
U.S. Appl. No. 12/225,014, Friction Materials Made With Resins Containing Polar Functional Groups, Timothy P. Newcomb, filed Sep. 10, 2008.
U.S. Appl. No. 10/678,720, Friction Material Containing Partially Carbonized Carbon Fibers, Robert C. Lam, filed Oct. 3, 2003.
U.S. Appl. No. 12/492,261, Friction Materials, Herschel L. McCord, filed Jun. 26, 2009.
U.S. Appl. No. 10/898,882, Porous Friction Material With Nanoparticles of Friction Modifying Material, Robert C. Lam, filed Jul. 26, 2004.
U.S. Appl. No. 10/678,598, Mixed Deposit Friction Material, Robert C. Lam, filed Oct. 3, 2003.
U.S. Appl. No. 10/678,599, High Performance, Durable, Deposit Friction Material, Robert C. Lam, filed Oct. 3, 2003.
U.S. Appl. No. 10/916,328, High Coefficient Woven Friction Material, Robert C. Lam, filed Aug. 11, 2004.
U.S. Appl. No. 12/157,901, Porous Friction Material Comprising Nanoparticles of Friction Modifying Material, Robert C. Lam, filed Jun. 12, 2008.

* cited by examiner

FRICTIONAL DEVICE COMPRISING AT LEAST ONE FRICTION PLATE

The present invention relates to a frictional device, such as a plate clutch, for example, comprising at least one friction plate, which has a plate-side toothing system, and a plate carrier, which has a carrier-side toothing system and a predefined fitting on which to fit the friction plate, the contours of the toothing systems corresponding to one another in such a way that the friction plate can be brought into engagement with the plate carrier, forming a rotational drive connection, and the friction plate having a first axial direction and an opposing second axial direction.

DE 43 02 773 A1 describes a friction part in the form of a friction plate, which can be used in a frictional device, such as a clutch, for example. The known friction plate comprises an annular disk-shaped carrier part with a friction face being provided on its front and rear side respectively. Inside the friction face grooves are provided, which extend from a radially inner edge of the friction faces to a radially outer edge of the friction faces. The grooves are here inclined exclusively in one of the two circumferential directions of the friction plate. In operation inside the clutch this inclination of the grooves serves to purposely conduct the cooling oil inside the grooves in this one circumferential direction. In order to be able to fix the known friction plate to a plate carrier or the like, the annular disk-shaped carrier part has a plate-side toothing system on its inward facing edge, the plate-side toothing system embodied as an internal toothing system being of uniform design. The plate carrier correspondingly has a carrier-side toothing system auf, which in this example would have to be formed as an external toothing system. The contours of the two toothing systems here correspond to one another in such a way that the known friction plate can be brought into engagement with the plate carrier, forming a rotational drive connection. For this purpose the friction plate merely has to be fitted or pushed in one of its axial directions over a predefined fitting end of the plate carrier onto the plate carrier.

A friction plate substantially identical to the friction plate previously described is also described in U.S. Pat. No. 5,460,255. The known friction plate is designed for use inside a wet-running friction clutch and likewise has an internal toothing system, so as to be able to establish a rotational drive connection to the external toothing system of a plate carrier. Here too, the grooves inside the friction face are inclined in a circumferential direction and/or in relation to a radial, thereby producing a directed flow of cooling oil inside the grooves in a predefined circumferential direction of the friction plate when the friction plate is used inside the wet-running friction clutch.

The friction plates described above and known in the state of the art for use in a frictional device have been tried and proven in practice. There is the disadvantage, however, that the correct fitting of the known friction plates to the plate carrier is rendered more difficult. There is also the risk of fitting them incorrectly, particularly in the case of friction plates in which grooves, inclined in only one of the two circumferential directions, are provided in their friction face.

An object of the present invention, therefore, is to create a frictional device comprising at least one friction plate and a plate carrier, in which correct and easy fitting of the friction plate to the plate carrier is ensured.

This object is achieved by the features specified in claim 1. Advantageous embodiments of the invention form the subject matter of the dependent claims.

The frictional device according to the invention, which may be a clutch, for example, comprises at least one friction plate and one plate carrier. The friction plate has a plate-side toothing system. The plate-side toothing system may be embodied as an internal toothing system or as an external toothing system, for example, this conceivably relating to an inner plate in the former case and an outer plate in the latter case. The plate carrier correspondingly has a carrier-side toothing system. The carrier-side toothing system may be either an external toothing system or an internal toothing system, depending on the friction plate used. In the former case the plate carrier would accordingly be termed an inner plate carrier, whereas in the latter case it would be termed an outer plate carrier. The plate carrier furthermore comprises a predefined fitting end on which to fit the friction plate. The term predefined fitting end is here taken to mean that end of the plate carrier pointing in an axial direction, over which the friction plate is intended to be fitted or pushed onto the plate carrier. The contours the toothing systems correspond to one another in such a way that the friction plate can be brought into engagement with the plate carrier, forming a rotational drive connection, when the friction plate is fitted or pushed over the predefined fitting end in an axial direction onto the plate carrier. The term contours of the two toothing systems is here taken to mean those contours of the toothing systems which are visible when the toothing systems are viewed in the axial direction. The friction plate itself has a first axial direction and a second axial direction opposed to the first axial direction. According to the invention the contours of the toothing systems are formed and matched to one another in such a way that only in its first axial direction can the friction plate be brought over the predefined fitting end of the plate carrier and into engagement with the plate carrier, producing a rotational drive connection through the two toothing systems.

Whereas with the frictional devices known in the state of the art uniform plate-side and carrier-side toothing systems are provided, which allow the friction plate to be fitted or pushed onto the plate carrier in two axial directions of the friction plate, in the case of the device according to the invention this is precluded in that although the contours of the plate-side and carrier-side toothing systems correspond to one another, they are modified in such a way that only in the first axial direction is it possible to fit the friction plate. This means that the form of the contour according to the invention can be achieved by the use of different tooth or tooth space sizes, for example. The device according to the invention is particularly advantageous where the friction plates have to be pushed on in a predefined axial direction, in order to obtain a predefined ducting of the coolant between the friction plates inside the device. This is particularly the case where grooves are provided in the friction faces of the friction plate, which are intended to bring about a predefined ducting of the coolant in only one of the two circumferential directions of the friction plate. Incorrect fitting of the friction plate into the device according to the invention is reliably prevented, thereby facilitating its assembly.

In a preferred embodiment of the device according to the invention the plate-side toothing system has a first tooth, which is of a different size to the other teeth of the plate-side toothing system, and a first tooth space, which is of a different size to the other tooth spaces of the plate-side toothing system. Since the contours of the plate-side toothing system and the carrier-side toothing system substantially correspond to one another, the carrier-side toothing system accordingly has a tooth space, which is of a different size to the other tooth spaces of the carrier-side toothing system and is capable of receiving the first tooth of the plate-side toothing system. As a further result of the toothing systems corresponding to one another, the carrier-side toothing system has a corresponding tooth, which is of a different size to the other teeth of the carrier-side toothing system and which can be received in the first tooth space of the plate-side toothing system. The term size of the teeth or the tooth spaces is here taken to mean those dimensions of the tooth or the tooth space, which are visible when the toothing systems are viewed in an axial direction.

In principle, more than one tooth may be formed in the shape of the first tooth and more than one tooth space in the shape of the first tooth space. In order to make the friction plate easier to fit to the plate carrier, however, the plate-side toothing system comprises only one first tooth and the other teeth, the other teeth having the same size, and/or only one first tooth space and the other spaces, the other tooth spaces being of the same size. Providing only one first tooth and one first tooth space and the other teeth and/or tooth spaces, whilst the other teeth and other tooth spaces are of the same size as one another, makes it particularly easy for the fitter to determine in which rotational position and in which of the two axial directions the friction plate has to be fitted or pushed over the predefined fitting end of the plate carrier. This further facilitates and therefore speeds up the process of fitting the friction plate to the plate carrier.

In an advantageous embodiment of the device according to the invention the first tooth has a different tooth height and/or tooth width to the other teeth of the plate-side toothing system. The term tooth height is here and hereinafter taken to mean the height of the tooth in a radial direction, whilst the term tooth width refers to the width of the tooth in a circumferential direction. In this embodiment it is particularly advantageous if the first tooth has a different tooth height, preferably a greater tooth height, than the other teeth of the plate-side toothing system, especially since the fitter can then identify the first tooth even more rapidly, in order to determine the necessary rotational position of the friction plate and that axial direction in which the friction plate has to be fitted or pushed over the predefined fitting end of the plate carrier onto the plate carrier. This advantage is not so pronounced in the case of a first tooth which has only a different tooth width but not a different tooth height to the other teeth of the plate-side toothing system. On the other hand this advantage is more pronounced in the case of a first tooth, which has both a greater tooth height and a greater tooth width than the other teeth of the plate-side toothing system.

In a further advantageous embodiment of the device according to the invention the first tooth space has a different tooth space depth and/or tooth space width to the other tooth spaces of the plate-side toothing system. The term tooth space depth is here taken to mean the depth of the tooth space in a radial direction, the tooth space width describing the width of the tooth space in a circumferential direction. The stipulations with the regard to the first tooth in the embodiment previously described also apply analogously to the first tooth space.

In order to reliably prevent incorrect fitting of the friction plate, in a particularly advantageous embodiment of the device according to the invention the first tooth has a first middle radial and the first tooth space has a second middle radial, the first and second middle radials being set at an angle to one another. The term first middle radial is here taken to mean a radial which extends through the center point of the first tooth, when this is viewed in an axial direction. Accordingly the term second middle radial is taken to mean a radial which extends through the center point of the first tooth space when this is viewed in an axial direction. Ideally the middle radials form an axis of symmetry of the first tooth and tooth space. In this embodiment the first tooth and the first tooth space are therefore not arranged offset by 180 degrees in a circumferential direction in relation to one another, so that an incorrect fitting of the friction plate becomes impossible.

In order that the fitter can determine the necessary rotational position relative to the plate carrier and that axial direction in which the friction plate has to be fitted or pushed over the predefined fitting end onto the plate carrier, in a further particularly preferred embodiment of the device according to the invention the first tooth is arranged directly adjacent to the first tooth space. It is preferred here if the first tooth has a greater tooth height than the other teeth and the first tooth space a greater tooth depth than the other tooth spaces of the plate-side toothing system, especially as the first tooth and the first tooth space are then particularly easy for the fitter to identify. The term directly adjacent is here take to mean that no further tooth and tooth space of the plate-side toothing system is provided in a circumferential direction between the first tooth and the first tooth space.

In the embodiments of the invention described above the size of a first tooth and the size of a first tooth space have been substantially varied, in order to generate a contour of the toothing system or toothing systems, which means that only in the first axial direction can the friction plate be brought over the predefined fitting end of the plate carrier and into engagement with the plate carrier. In an alternative embodiment of the invention, however, either a first and second tooth of the toothing system or a first and second tooth space of the toothing system can also be varied in size, in such a way that the object of the invention is achieved.

Thus in a further preferred embodiment of the device according to the invention the plate-side toothing system comprises a first tooth and a second tooth, the first tooth being of a different size to the other teeth of the plate-side toothing system and the second tooth being of a different size to the other teeth of the plate-side toothing system and the first tooth. The first and second tooth therefore have different sizes from one another, their size in turn differing from the sizes of the other teeth of the plate-side toothing system. Alternatively, in a further preferred embodiment of the device according to the invention the plate-side toothing system has a first tooth space and a second tooth space, the first tooth space being of a different size to the other tooth spaces of the plate-side toothing system and the second tooth space being of a different size to the other tooth spaces of the plate-side toothing system and the first tooth space. Here the first tooth space and the second tooth space would accordingly be of different sizes, which in turn differ from the size of the other tooth spaces of the plate-side toothing system. As already described previously with reference to the other embodiments, the contour of the carrier-side toothing system corresponds to the contour of the plate-side toothing system thereby created, in order to achieve the object of the invention. For the advantages of this embodiment reference should be made to the preceding description of the other embodiments.

In a further preferred embodiment of the device according to the invention the plate-side toothing system comprises only a first and second tooth and the other teeth, the other teeth being of the same size, and/or having only one first tooth space and the other tooth spaces, the other tooth spaces being of the same size. As already previously explained, it is therefore particularly easy for the fitter to determine the necessary rotational position of the friction plate and its first axial direction, thereby facilitating the assembly process.

In a further advantageous embodiment of the device according to the invention the first tooth has a different tooth height and/or tooth width to the other teeth of the plate-side toothing system and the second tooth has a different tooth height and/or tooth width form the other teeth of the plate-side toothing system and the first tooth. Alternatively the first tooth space has a different tooth space depth and/or tooth space width to the other tooth spaces of the plate-side toothing system and the second tooth space has a different tooth space depth and/or tooth space width to the other tooth spaces of the plate-side toothing system and the first tooth space.

In a further particularly preferred embodiment of the device according to the invention the first tooth or the first tooth space has a first middle radial and the second tooth or the second tooth space has a second middle radial, the first and second middle radials being set at an angle to one another. As already explained in the introductory part, this serves to prevent incorrect fitting of the friction plate, since fitting or pushing the friction plate onto the plate carrier in its second axial direction is precluded.

In a further advantageous embodiment of the device according to the invention the first tooth is arranged adjacent to the second tooth, forming just one tooth space, or the first tooth space is arranged adjacent to the second tooth space, forming just one intervening tooth. Here too, it is a particular quick matter for the fitter to determine the rotational position of the friction plate necessary for assembly and the first axial direction, in which the friction plate can be fitted or pushed onto the plate carrier.

In a further particularly preferred embodiment of the device according to the invention the friction plate has a front side with a first friction face and a rear side with a second friction face. Thus the front side, for example, may point in the first axial direction, whilst the rear side may point in the opposite second axial direction. In the first and/or second friction face grooves are provided, which are formed in such a way that when the device is in operation a coolant inside the majority of grooves, preferably in each of the grooves in the first and/or second friction face can be conducted in a radial direction and only one of the circumferential directions of the friction plate relative to the friction plate. In the case of friction plates with grooves formed in such a way for conducting the coolant in only one of the circumferential directions it is generally necessary for these friction plates to be fitted in a predefined axial direction thereof, in order to bring about a directed ducting of the coolant, for example cooling oil. The advantages of the device according to the invention are therefore particularly manifest in a friction plate having such grooves in the friction faces.

In a further advantageous embodiment of the device according to the invention the majority of the grooves, preferably each of the grooves in the first and/or second friction face of the friction plate are inclined in only one circumferential direction of the friction plate. Alternatively or in addition each groove has an inlet opening and an outlet opening, the inlet opening in being offset in relation to the outlet opening in only one circumferential direction of the friction plate.

In a further advantageous embodiment of the device according to the invention the friction plate is embodied as an annular disk.

In a further advantageous embodiment of the device according to the invention the plate-side toothing system is embodied as an internal or external toothing system and the carrier-side toothing system as an external or internal toothing system. In this way the plate-side toothing system and the carrier-side toothing system are capable of forming a simple slip-on gearing, which can be pushed together in an axial direction.

In a further preferred embodiment of the device according to the invention the device is a clutch, preferably a plate clutch.

In a further particularly preferred embodiment of the device according to the invention the clutch is embodied as a wet-running clutch.

Figure 2:
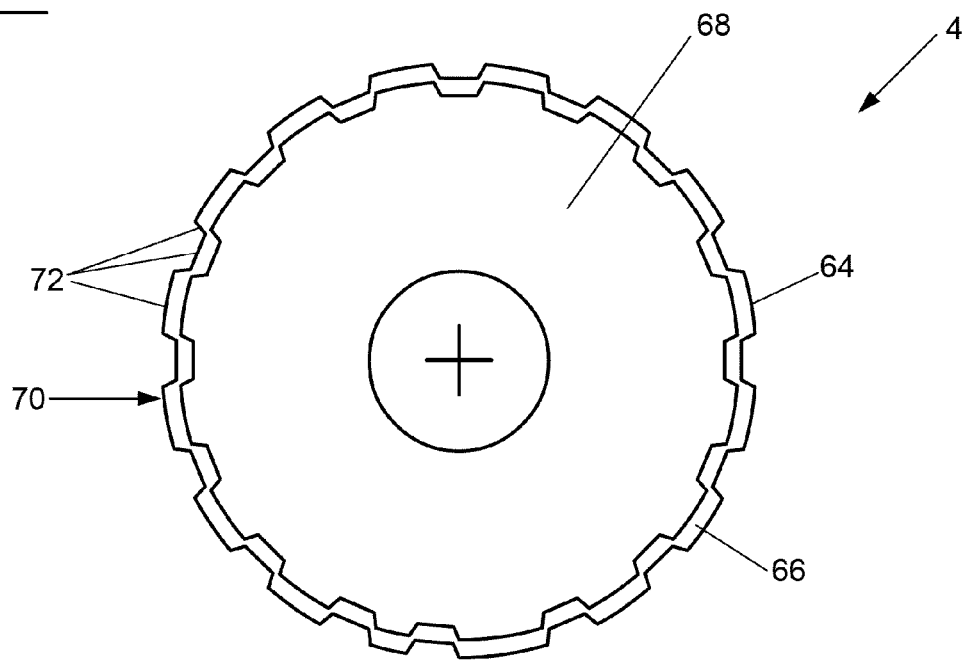
Figure 3:
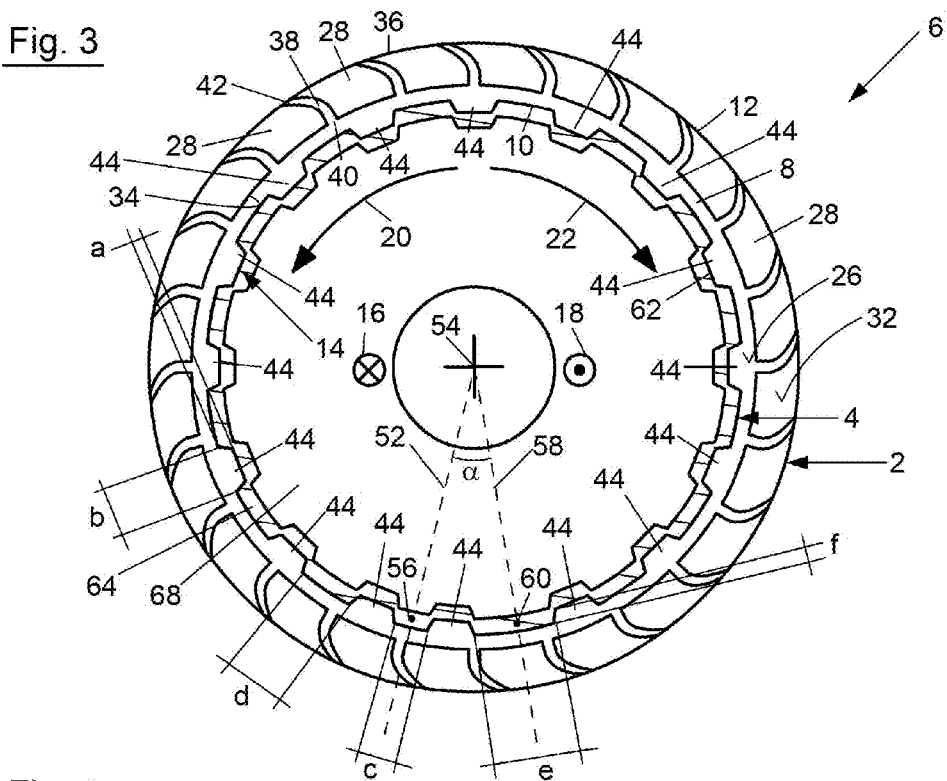
Figure 4:
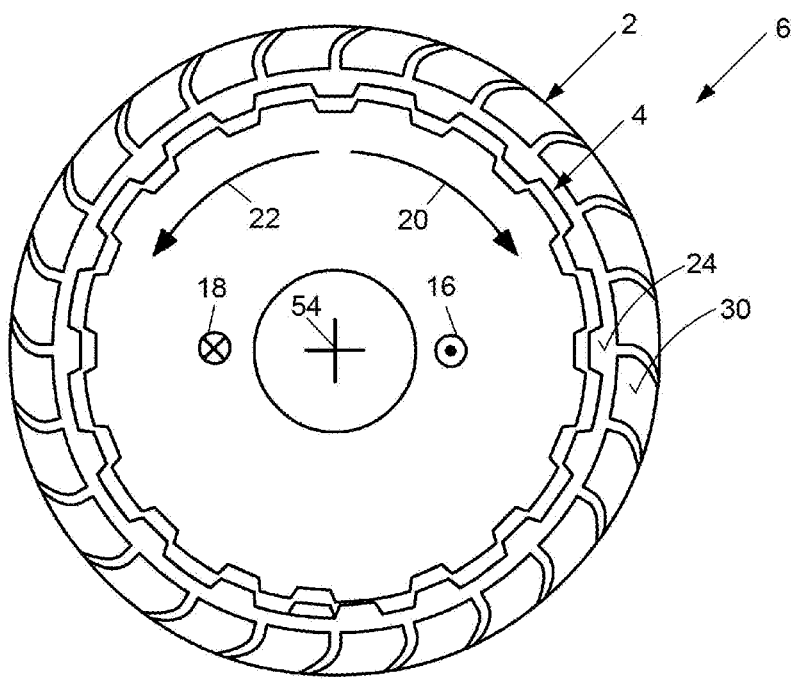
Figure 5:
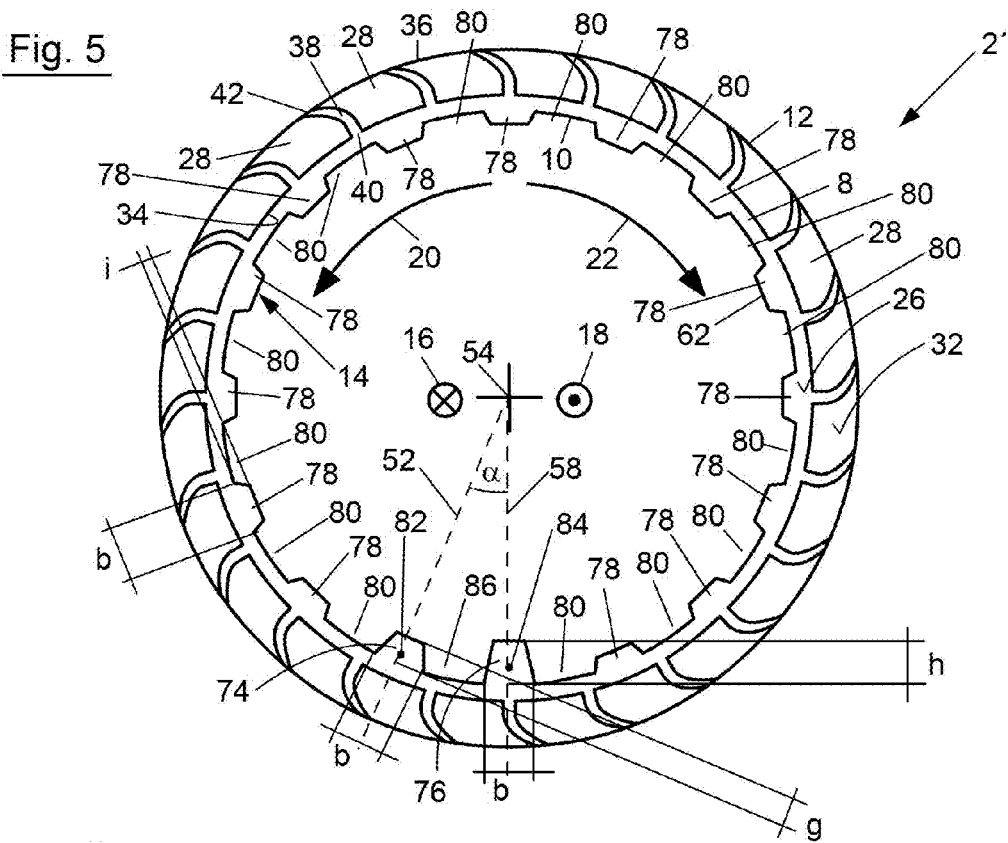
Figure 6:
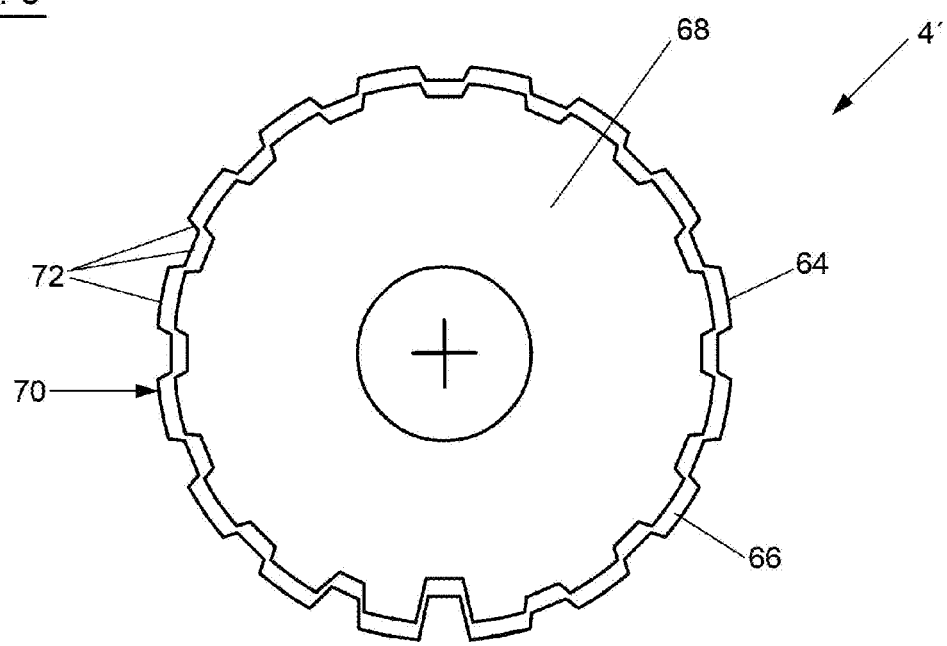
Figure 7:
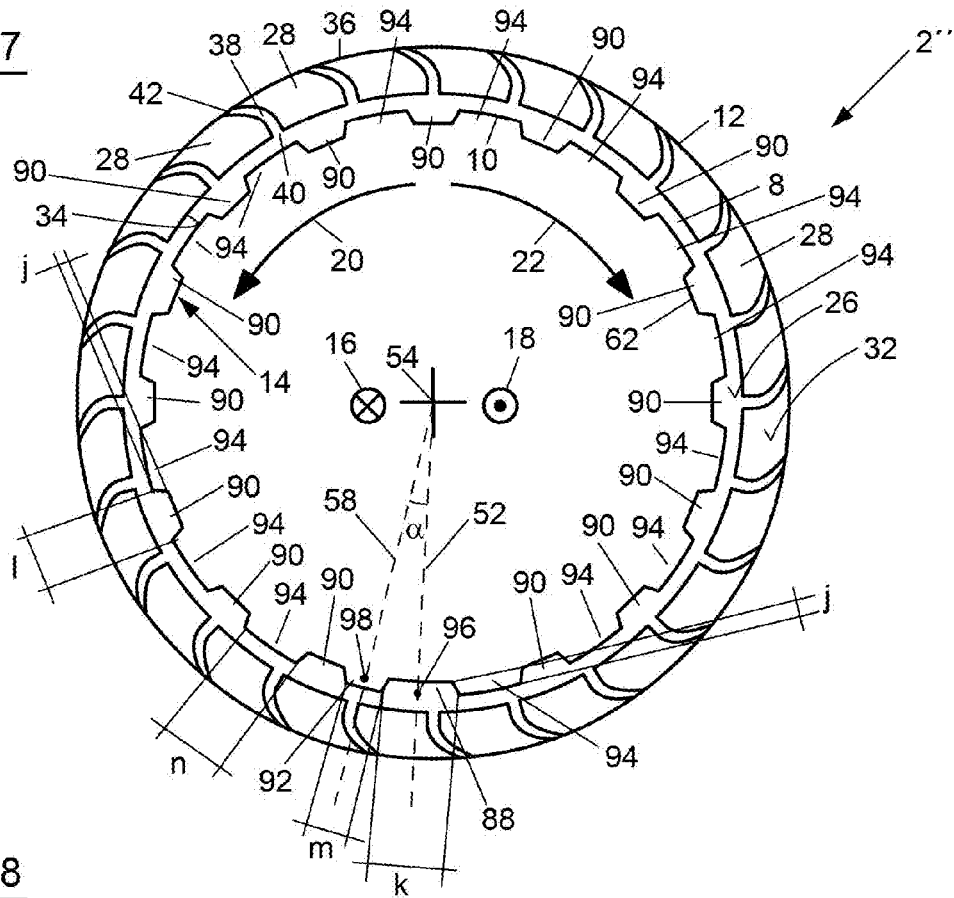
Figure 8:
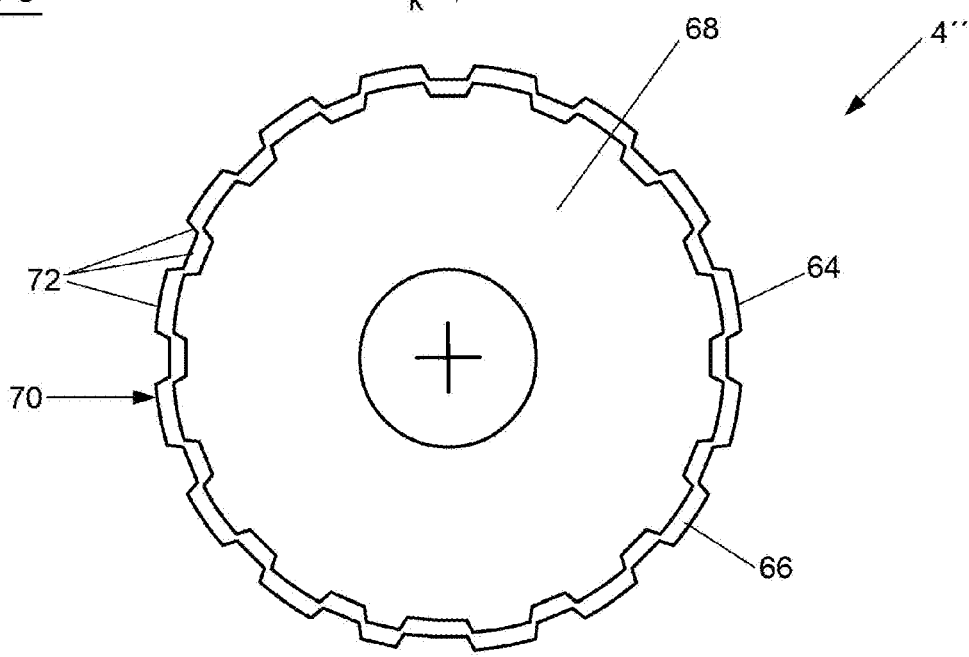
Figure 9:
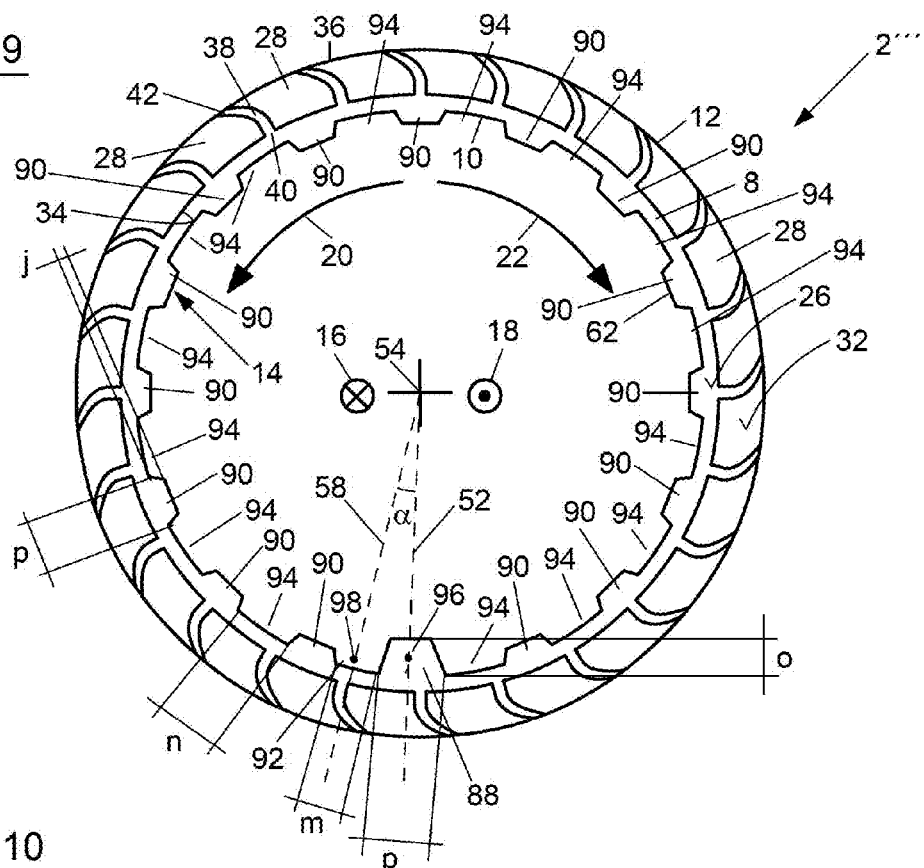
Figure 10:
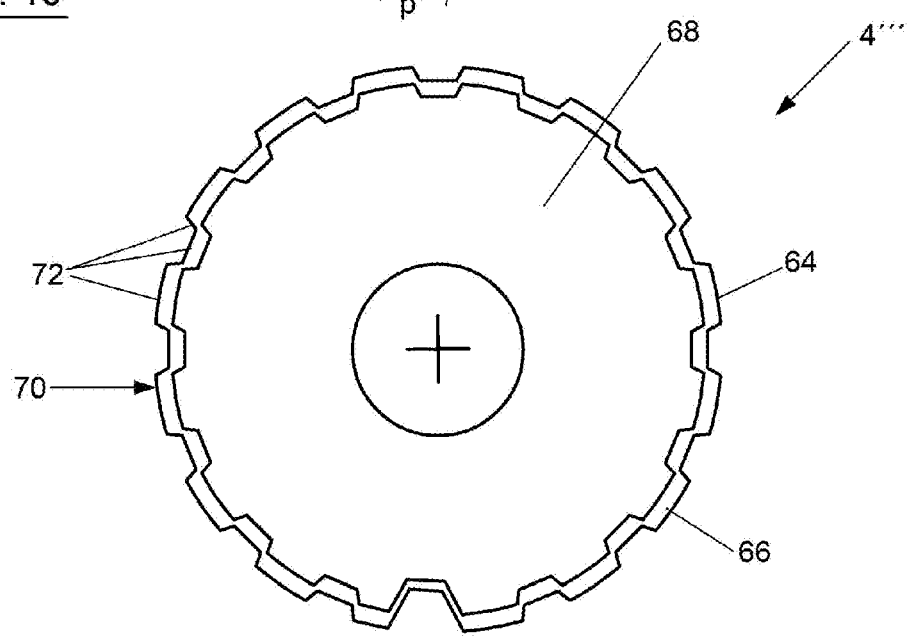
Figure 11:
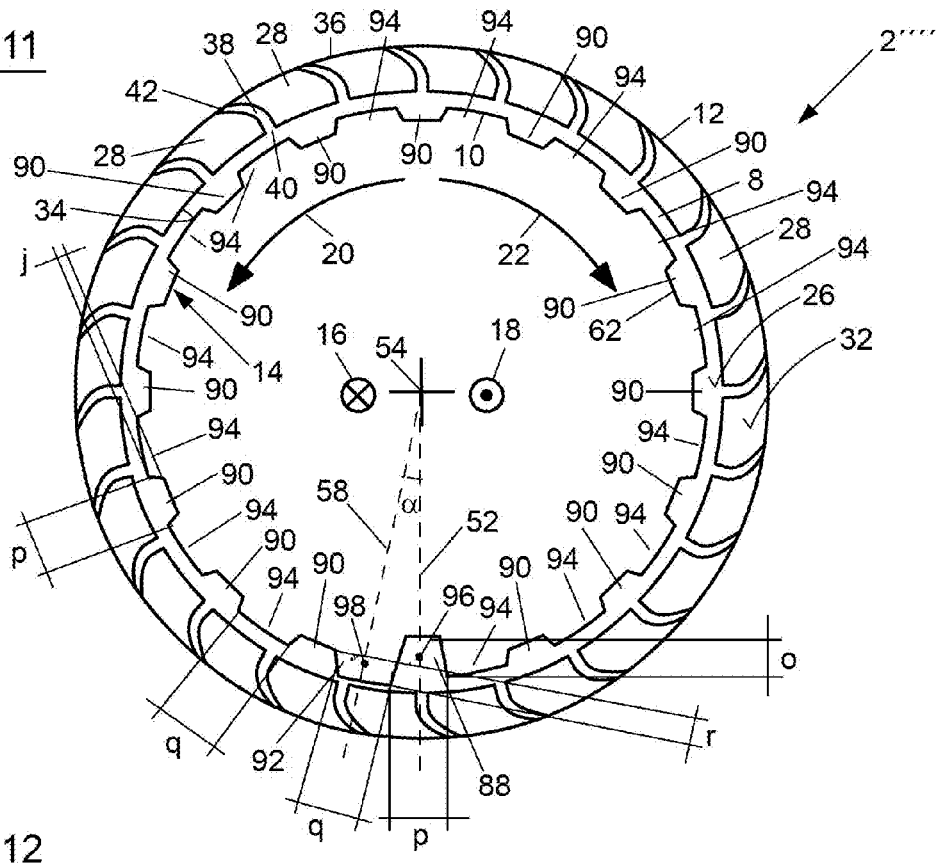
Figure 12:
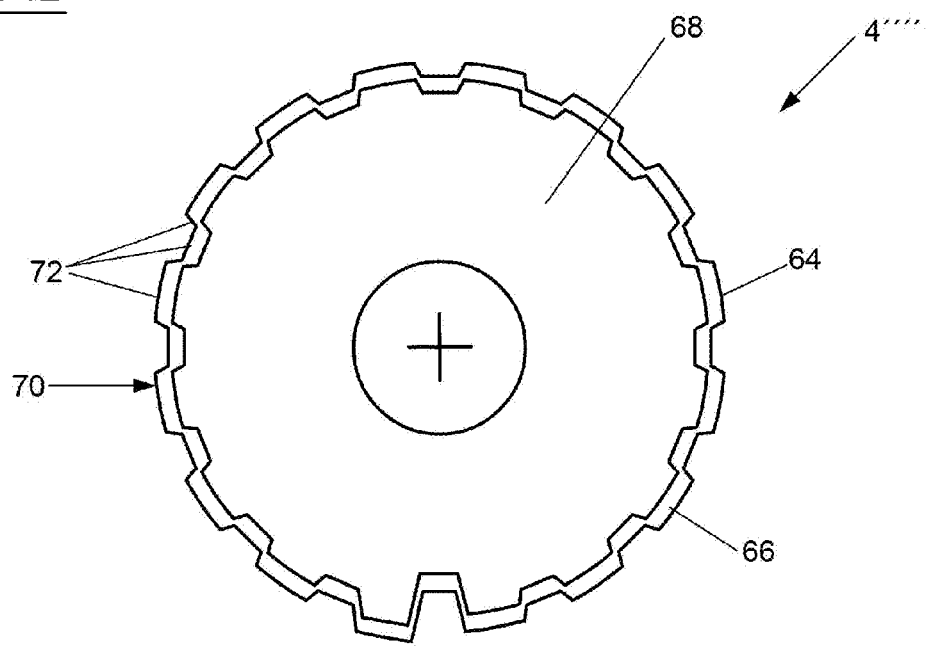

The invention will be explained in more detail below on the basis of exemplary embodiments and with reference to the drawings attached, in which:

FIG. 1 shows a rear view of a friction plate for a first embodiment of the device according to the invention, FIG. 2 shows a top view of the fitting end of a plate carrier for the first embodiment of the device according to the invention, FIG. 3 shows the first embodiment of the device according to the invention, in which the friction plate from FIG. 1 has been correctly fitted onto the plate carrier in FIG. 2, FIG. 4 shows the first embodiment of the clutch arrangement according to the invention in which an attempt is made to fit the friction plate from FIG. 1 onto the plate carrier in FIG. 2 in the wrong axial direction, FIG. 5 shows a rear view of a friction plate for a second embodiment of the device according to the invention, FIG. 6 shows a top view of the fitting end of a plate carrier for the second embodiment of the device according to the invention, FIG. 7 shows a rear view of a friction plate for a third embodiment of the device according to the invention, FIG. 8 shows a top view of the fitting end of a plate carrier for the third embodiment of the device according to the invention, FIG. 9 shows a rear view of a friction plate for a fourth embodiment of the device according to the invention, FIG. 10 shows a top view of the fitting end of a plate carrier for the fourth embodiment of the device according to the invention, FIG. 11 shows a rear view of a friction plate for a fifth embodiment of the device according to the invention and FIG. 12 shows a top view of the fitting end of a plate carrier for the fifth embodiment of the device according to the invention.

FIG. 1 shows a rear view of a friction plate 2 and FIG. 2 shows a top view of the fitting end of a plate carrier 4, the friction plate 2 and the plate carrier 4 being designed for a first embodiment of a frictional device 6 according to the invention, which is shown in FIGS. 3 and 4. The frictional device 6 in FIGS. 3 and 4 is a plate clutch, which is embodied as a wet-running clutch.

The friction plate 2 shown in FIG. 1 comprises a lining carrier 8, which is embodied as an annular steel disk, which extends in the plane of projection and has an inner edge 10 and an outer edge 12. Formed on the inner edge 10 of the lining carrier 8 is a plate-side toothing system 14, which may therefore be regarded as an internal toothing system, so that the friction plate 2 in the present example is embodied as an inner plate. Alternatively, however, the plate-side toothing system 14 may also be embodied as an external toothing system at the outer edge 12 of the lining carrier 8, in which case the friction plate 2 would be an outer plate. The friction plate 2 has a first axial direction 16 and a second axial direction 18 opposed to the first axial direction 16. In addition the friction plate 2 has a first circumferential direction 20 and a second circumferential direction 22 opposed to the first circumferential direction 20. The corresponding directions 16, 18, 20, 22 are indicated by arrows in FIG. 1.

The lining carrier 8 of the friction plate 2 has a front side 24 pointing in the first axial direction 16 and a rear side 26 pointing in the second axial direction 18, the rear side 26 facing the observer in FIG. 1, whilst the front side 24 faces the observer in FIG. 4. Friction lining segments 28 for forming a substantially annular first friction face 30 on the front side 24 and a second friction face 32 on the rear side 26 of the lining carrier 8 are provided both on the front side 24 and on the rear side 26. The annular friction faces 30, 32 each comprise an inner edge 34 and an outer edge 36. Both in the first and the second friction face 30, 32, grooves are furthermore provided between the friction lining segments 28 and extend from an inlet opening 40 at the inner edge 34 radially outwards to an outlet opening 42 at the outer edge 36. The majority of the grooves, and in this example each of the grooves 38 in the first and second friction faces 30, 32 of the friction plate 2 is, in its course between the inlet opening 40 and the outlet opening 42, inclined or curved in only one circumferential direction of the friction plate 2, this in the present example being the first circumferential direction 20. The inlet opening 40 of each groove 38 in the friction faces 30, 32 opposite the outlet opening 42 is therefore offset in relation to the outlet opening 42 in the opposing second circumferential direction 22 of the friction plate 2. The design of the grooves 38 just described means that during a rotation of the friction plate 2 in a circumferential direction 22 a coolant, such as cooling oil, for example, inside the grooves 38 both in the first and in the second friction face 30, 32 would be conducted on the one hand in a radial direction and on the other only in the circumferential direction 22 of the friction plate 2 relative to the friction plate 2. Since the friction plate 2 with the grooves 38 described therefore causes a movement of the coolant conducted and directed in a circumferential direction 20, a correct fitting of the friction plate 2 in the device 6 is absolutely essential.

For this purposes the lining carrier 8 has the special plate-side toothing system 14. The plate-side toothing system 14 comprises multiple, radially inward-projecting teeth 44, which all have the same tooth height a and the same tooth width b. The plate-side toothing system 14 furthermore has a first tooth space 46 and a second tooth space 48. Here both the first tooth space 46 and the second tooth space 48 is of a different size to the other tooth spaces 50 of the plate-side toothing system 14. In addition the second tooth space 48 is of a different size to the first tooth space 46. In the embodiment shown this is achieved in that the tooth space width c of the first tooth space 46 is smaller than the tooth space width d of the other tooth spaces 50, whilst the tooth space width e of the second tooth space 48 is larger than the tooth space width d of the other tooth spaces 50. The tooth space height f corresponds to the tooth height a and is identical for all tooth spaces 46, 48, 50.

It can further be seen from FIG. 1 that the first tooth space 46 has a first middle radial 52, which extends from the axis of rotation 54 of the friction plate 2 in a radial direction through the center point 56 of the first tooth space 46 indicated in FIG. 1, and the second tooth space 48 has a second middle radial 58, which extends from the axis of rotation 54 of the friction plate 2 in a radial direction through the center point 60 of the second tooth space 48 indicated in FIG. 1. The first and second middle radial 52, 58 are here set at an angle to one another, as is indicated by the angle α in FIG. 1. This means that the first and second tooth space 46, 48 are not merely offset by 180 degrees in the plate-side toothing system 14.

It can also be seen from FIG. 1 that starting from the first tooth space 46 in a circumferential direction 20 only one intervening tooth 44 is provided between the first tooth space 46 and the second tooth space 48. The second tooth space 48 is therefore arranged adjacent to the first tooth space 46 in a circumferential direction 20. The plate-side toothing system 14 formed in the manner described above therefore has a contour 62, which is formed by the inner edge 10 of the lining carrier 8 of the friction plate 2.

The plate carrier 4 shown in FIG. 2 comprises a substantially tubular carrier section 64, the predefined fitting end 66 of which is turned to face the observer in FIG. 2. Adjoining the side of the tubular carrier section 64 remote from the predefined fitting end 66 is a support section 68, which extends in a radial direction and serves to support the plate carrier 4 on an input or output shaft or hub (not shown). The predefined fitting end 66 here denotes that end of the tubular carrier section 64, over which the friction plate 2 in FIG. 1 is to be fitted or pushed onto the plate carrier 4 in FIG. 2.

The tubular carrier section 64 of the plate carrier 4 has a carrier-side toothing system 70, which in the present embodiment is embodied as an external toothing system and has been produced by a deep-drawing or stamping operation, for example. The carrier-side toothing system 70 here has a contour 72. Viewing the contour 72 in the direction of the predefined fitting end 66 (FIG. 2), the contour 72 substantially matches the contour 62 of the plate-side toothing system 14, when the latter is viewed in the first axial direction 16 (FIG. 1). The contours 62, 72 of the toothing systems 14, 70 therefore correspond to one another in such a way that the friction plate 2 can be fitted or pushed over the predefined fitting end 66 of the plate carrier 4, in the first axial direction 16 onto the plate carrier 4, as is shown in FIG. 3. In so doing the toothing systems 14, 72 intermesh in such a way that a rotational drive connection is produced between the friction plate 2 and the tubular carrier section 64 of the plate carrier 4 in the circumferential directions 20, 22.

Fitting or pushing the friction plate 2 onto the plate carrier 4 over its predefined fitting end 66, however, is possible only in the first axial direction 16 of the friction plate 2. Should the fitter turn the friction plate 2 in such a way that the front side 24 of the friction plate 2 is facing him (FIG. 4), before trying to fit the friction plate 2 over the predefined fitting end 66 onto the plate carrier 4 in the second axial direction 18, this will prove impossible. Instead, at least one tooth 44 of the plate-side toothing system 14 would strike against the end face of the predefined fitting end 66 facing the observer in FIG. 4, and prevent the friction plate 2 being fitted or pushed onto the tubular carrier section 64 of the plate carrier 4. Even turning the friction plate 2 in either of the circumferential directions 20, 22 about the axis of rotation 54 cannot alter this in any way.

The components of a second embodiment of the device according to the invention 6 will be described below with reference to FIGS. 5 and 6, it being proposed to examine only the differences compared to the first embodiment in FIGS. 1 to 4 and to use the same reference numerals for identical or similar parts, so that the preceding description will also apply analogously to this embodiment.

The plate-side toothing system 14 of the friction plate 2' represented in FIG. 5 comprises a first tooth 74 and a second tooth 76, the first and second tooth 74, 76 being of a different size to the other teeth 78 of the plate-side toothing system 14. In addition the first tooth 74 is of a different size to the second tooth 76. This is due to the fact that the tooth heights g, h of the first and second teeth 74, 76 are of different design. Thus the tooth height h of the second tooth 76 is greater than the tooth height g of the first tooth 74. Furthermore the tooth heights i of the other teeth 78 are equal, so that: h>g>i. The teeth 74, 76, 78 of the plate-side toothing system 14 have the same tooth width b. Moreover the tooth spaces 80 between the teeth 74, 76, 78 are of the same size, i.e. these match both in respect of the tooth space width and of the tooth space height of the tooth spaces 80.

In this embodiment, too, there is a first middle radial 52 and a second middle radial 58. The first middle radial 52 here extends from the axis of rotation 54 of the friction plate 2 through the center point 82 of the first tooth 74 indicated in FIG. 5, whilst the second middle radial 58 extends from the axis of rotation 54 through the center point 84 of the second tooth 76. In this case, too, the first and second middle radial 52, 58 are set at an angle to one another, the first tooth 74 being arranged adjacent to the second tooth 76 in such a way that only one tooth space 86 is formed between the first and second tooth 74, 76. The tooth heights g, h of the teeth 74, 76 mean that only the tooth space 86 has a greater tooth space depth than the other tooth spaces 80.

The contour 62 of the plate-side toothing system 14 in FIG. 5 and the contour 72 of the carrier-side toothing system 70 corresponding thereto, which is shown in FIG. 6, mean that it is again only possible to fit or push the friction plate 2' over the predefined fitting end 66 onto the plate carrier 4' shown in FIG. 6 in the first axial direction 16. In the opposite second axial direction 18 this is not possible since one of the teeth 74, 76 of the plate-side toothing system 14 would then again strike against the end face of the predefined fitting end 66 of the plate carrier 4'.

In the two embodiments according to FIGS. 1 to 4 and 5 to 6 the variation in the contours 62, 72 has been modified by a change in the size of two tooth spaces 46, 48 and/or two teeth 74, 76. Embodiments of the device 6 according to the invention, in which the contour 62 is modified by a change in the size of one tooth space and one tooth, will be described below.

FIGS. 7 and 8 therefore show the components of a third embodiment of the device 6 according to the invention. The plate-side toothing system 14 of the friction plate 2" has a first tooth 88, which is of a different size to the other teeth 90 of the plate-side toothing system 14, and a first tooth space 92, which is of a different size to the other tooth spaces 94 of the plate-side toothing system 14. The first tooth 88 here has a tooth height j, which corresponds to the tooth height j of the other teeth 90. In order to obtain a larger first tooth 88, however, the first tooth 88 has a tooth width k, which is greater than the tooth width l of the other teeth 90. The tooth space depth of the first tooth space 92 in this embodiment corresponds to the tooth height j of the first tooth 88 and to the tooth space depth of the other tooth spaces 94. In order to obtain a first tooth space 92 of a different size, however, the tooth space width m of the first tooth space 92 is made smaller than the tooth space width n of the other tooth spaces 94.

The contour 72 of the plate-side toothing system 14 formed in such a way again corresponds to the contour 72 of the carrier-side toothing system 70, so that only in the first axial direction 16 can the friction plate 2" be fitted or pushed over the predefined fitting end 66 of the plate carrier 4", which is shown in FIG. 8. This is ensured, among other things, by the fact that the first tooth 88 again has a first middle radial 52, which extends through the center point 96 of the first tooth 88, a second middle radial 58 furthermore being provided, which extends through the center point 98 of the first tooth space 92, the first and second middle radial 52, 58 again being set at an angle to one another. In addition the first tooth 88 is arranged directly adjacent to the first tooth space 92.

FIGS. 9 and 10 show the components of a fourth embodiment of the device 6 according to the invention, it being proposed to examine below only the differences compared to the third embodiment, the preceding embodiment otherwise applying analogously. In contrast to the third embodiment in FIGS. 7 and 8, the size of the first tooth 88 is modified in relation to the size of the other teeth 90 in such a way that this has a greater tooth height o than the other teeth 90, i.e. o>j. The tooth width p of the first tooth 88 on the other hand corresponds to the tooth width p of the other teeth 90. One of the advantages of this embodiment is that the fitter can identify the first tooth 88 particularly quickly, thereby facilitating the process of assembly.

In order to enhance the aforementioned advantage yet further, the components shown in FIGS. 11 and 12 have been created for a fifth embodiment of the device 6 according to the invention, the fifth embodiment substantially resembling the fourth embodiment, so that it is proposed to examine below only the differences compared to the fourth embodiment. The preceding description of the fourth embodiment will otherwise apply analogously. In contrast to the fourth embodiment the plate-side toothing system 14 of the friction plate 2"" comprises a first tooth space 92, the size of which is not achieved through a modification of the tooth space width. Instead the first tooth space 92 has the same tooth space width q as the other tooth spaces 94. The tooth space depth r of the first tooth space 92 is, however, made greater than the tooth space depth s of the other tooth spaces 94. Arranging the first tooth space 92 directly adjacent to the first tooth 88, which has a greater tooth height o than the other teeth 90, produces a greater contrast, which means that it is particularly easy matter the fitter to identify the first tooth 88. This permanently facilitates the process of assembly.

| List of reference numerals | |
|---|---|
| 2 to 2"" | friction plate |
| 4 to 4"" | plate carrier |
| 6 | frictional device |
| 8 | lining carrier |
| 10 | inner edge |
| 12 | outer edge |
| 14 | plate-side toothing system |
| 16 | first axial direction |
| 18 | second axial direction |
| 20 | first circumferential direction |
| 22 | second circumferential direction |
| 24 | front side |
| 26 | rear side |
| 28 | friction lining segments |
| 30 | first friction face |
| 32 | second friction face |
| 34 | inner edge |
| 36 | outer edge |
| 38 | grooves |
| 40 | inlet opening |
| 42 | outlet opening |
| 44 | teeth |
| 46 | first tooth space |
| 48 | second tooth space |
| 50 | other tooth spaces |
| 52 | first middle radial |
| 54 | axis of rotation |
| 56 | center point |
| 58 | second middle radial |
| 60 | center point |
| 62 | contour (plate-side toothing system) |
| 64 | tubular carrier section |
| 66 | predefined fitting end |
| 68 | support section |
| 70 | carrier-side toothing system |
| 72 | contour (carrier-side toothing system) |
| 74 | first tooth |
| 76 | second tooth |
| 78 | other teeth |
| 80 | tooth spaces |
| 82 | center point |
| 84 | center point |

-continued

| List of reference numerals | |
|---|---|
| 86 | tooth space |
| 88 | first tooth |
| 90 | other teeth |
| 92 | first tooth space |
| 94 | other tooth spaces |
| 96 | center point |
| 98 | center point |
| α | angle |
| a, g, h, i, j, o | tooth height |
| b, k, l, p | tooth width |
| c, d, e, m, n, q | tooth space width |
| f, r, s | tooth space depth |

The invention claimed is:

1. Frictional device comprising at least one friction plate, which has a plate-side toothing system, and a plate carrier, which has a carrier-side toothing system and a predefined fitting end for fitting the friction plate, the contours of the toothing systems corresponding to one another in such a way that the friction plate can be brought into engagement with the plate carrier, forming a rotational drive connection, and the friction plate has a first axial direction and an opposing second axial direction, wherein the contours of the toothing systems are formed in such a way that only in the first axial direction can the friction plate be brought into engagement with the plate carrier by way of the predefined fitting end of the plate carrier, wherein the plate-side toothing system has a first tooth, which is of a different size to the other teeth of the plate-side toothing system, and has a first tooth space, which is of a different size to the other tooth spaces of the plate-side toothing system, wherein the first tooth has a different tooth height than the other teeth of the plate-side toothing system.

2. Frictional device according to claim 1, wherein the plate-side toothing system comprises at least one of only one first tooth and the other teeth, the other teeth being of the same size, or only one first tooth space and the other tooth spaces, the other tooth spaces being of the same size.

3. Frictional device according to claim 1, wherein the first tooth space has a different tooth space depth or tooth space width to the other tooth spaces of the plate-side toothing system.

4. Frictional device according to claim 1, wherein the first tooth has a first middle radial and the first tooth space has a second middle radial, the first and second middle radials being set at an angle to one another.

5. Frictional device according to claim 1, wherein the first tooth is arranged directly adjacent to the first tooth space.

6. Frictional device according to claim 1, wherein the plate-side toothing system has a first tooth and a second tooth, the first tooth being of a different size to the other teeth of the plate-side toothing system and the second tooth being of a different size to the other teeth of the plate side toothing system and the first tooth, or that the plate-side toothing system has a first tooth space and a second tooth space, the first tooth space being of a different size to the other tooth spaces of the plate-side toothing system and the second tooth s pace being of a different size to the other tooth spaces of the plate-side toothing system and the first tooth space.

7. Frictional device according to claim 6, wherein the plate-side toothing system comprises only one first and second tooth and the other teeth, the other teeth being of the same size, or only one first and second tooth space and the other tooth spaces, the other tooth spaces being of the same size.

8. Frictional device according to claim 6, wherein the first tooth has a different tooth height or tooth width to the other teeth of the plate-side toothing system and the second tooth has a different tooth height or tooth width to the other teeth of the plate-side toothing system and the first tooth, or that the first tooth space has a different tooth space depth or tooth space width to the other tooth spaces of the plate-side toothing system and the second tooth space has a different tooth space depth or tooth space width to the other tooth spaces of the plate-side toothing system and the first tooth space.

9. Frictional device according to claim 1 wherein the first tooth or the first tooth space has a first middle radial and the second tooth or the second tooth space has a second middle radial, the first and second middle radials being set at an angle to one another.

10. Frictional device a cording to claim 6, wherein the first tooth is arranged adjacent to the second tooth, forming just one tooth space, or the first tooth space is arranged adjacent to the second tooth space, forming just one intervening tooth.

11. Frictional device according to claim 1, wherein the friction plate has a front side with a first friction face and a rear side with a second friction face, grooves being provided in the first or second friction face and formed in such a way that in the operation of the device a coolant inside the majority of the grooves in the first or second friction face can be conducted in a radial direction and only one of the circumferential directions of the friction plate relative to the friction plate.

12. Frictional device according to claim 11, wherein the all of the grooves in the first or second friction face of the friction plate has an inlet opening and an outlet opening, the inlet opening being offset in relation to the outlet opening in only a circumferential direction of rotation of the friction plate.

13. Frictional device according to claim 1, wherein the friction plate is embodied as an annular disk.

14. Frictional device according to claim 1, wherein the plate-side toothing system is embodied as an internal or external toothing system and the carrier-side toothing system as an external or internal toothing system.

15. Frictional device according to claim 1, wherein the device is a clutch, preferably a plate clutch.

16. Frictional device according to claim 15, wherein the clutch is a wet-running clutch.

17. A frictional device comprising at least one friction plate, which has a plate-side toothing system, and a plate carrier, which has a carrier-side toothing system and a predefined fitting end for fitting the friction plate, the contours of the toothing systems corresponding to one another in such a way that the friction plate can be brought into engagement with the plate carrier, forming a rotational drive connection, and the friction plate has a first axial direction, wherein the contours of the toothing system are formed in such a way that only in the first axial direction can the friction plate be brought into engagement with the plate carrier by way of the predefined fitting end of the plate carrier, and wherein the friction plate has a front side with a first friction face and a rear side with a second friction face, wherein the plate-side toothing system has a first tooth, which is of a different width to the other teeth of the plate-side toothing system, and has a first tooth space, which is of a different width to the other spaces of the plate-side toothing system, and grooves being provided in at least one of the first or second friction face and formed in such a way when the device is in operation a coolant inside the majority of the grooves is conducted in a radial direction.

18. A friction device as set forth in claim 17 wherein the plurality of the grooves provided in at least one of the first or second friction face extend in a radial direction and wherein one of the grooves in at least one of the first or second friction face extends in a circumferential direction relative to the friction plate.

19. The frictional device according to claim 1, wherein the plate-side toothing system has a first tooth, which is of a different size to the other teeth of the plate-side toothing system, and has a first tooth space, which is of a different size to the other tooth spaces of the plate-side toothing system.

20. Frictional device comprising at least one friction plate having a plate-side toothing system and a front side with a first friction face and a rear side with a second friction face with grooves provided in the first or second friction face, and a plate carrier, which has a carrier-side toothing system and a predefined fitting end for fitting the friction plate, the contours of the toothing systems corresponding to one another in such a way that the friction plate can be brought into engagement with the plate carrier, forming a rotational drive connection, and the friction plate has a first axial direction and an opposing second axial direction, wherein the contours of the toothing systems are formed in such a way that only in the first axial direction can the friction plate be brought into engagement with the plate carrier by way of the predefined fitting end of the plate carrier, wherein the plate-side toothing system has a first tooth, which is of a different width to the other teeth of the plate-side toothing system, and has a first tooth space, which is of a different width to the other tooth spaces of the plate-side toothing system, wherein at least the majority of the grooves in the first or second friction face of the friction plate has an inlet opening and an outlet opening, the inlet opening being offset in relation to the outlet opening in only a circumferential direction of rotation of the friction plate.

21. The frictional device according to claim 20 wherein all of the grooves in the first or second friction face of the friction plate has an inlet opening and an outlet opening, the inlet opening being offset in relation to the outlet opening in only a circumferential direction of rotation of the friction plate.

* * * * *